Nov. 7, 1961　　　　　　C. SENN　　　　3,008,033
WELDING GUN
Filed Sept. 19, 1960　　　　　　　　　　2 Sheets-Sheet 1

INVENTOR.
CHARLES SENN
BY Whittemore
Hulbert & Belknap
ATTORNEYS

Nov. 7, 1961  C. SENN  3,008,033
WELDING GUN
Filed Sept. 19, 1960  2 Sheets-Sheet 2
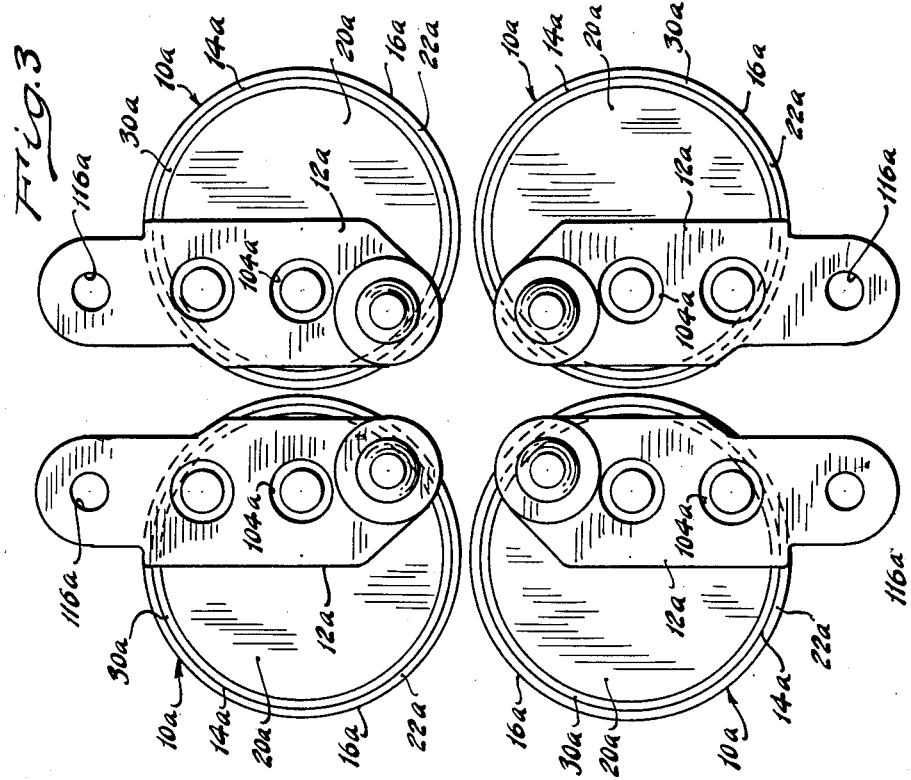
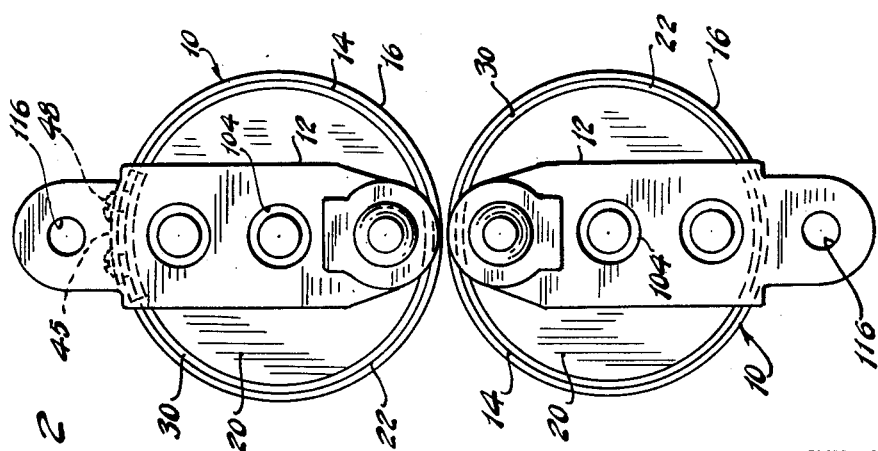
INVENTOR.
CHARLES SENN
BY Whittemore
Hulbert & Belknap
ATTORNEYS.

United States Patent Office 3,008,033
Patented Nov. 7, 1961

3,008,033
WELDING GUN
Charles Senn, 12633 Wilfred, Detroit, Mich.
Filed Sept. 19, 1960, Ser. No. 56,867
11 Claims. (Cl. 219—89)

The invention relates to welding guns and refers more specifically to a welding gun adapted to be air actuated and including a welding tip mounted eccentrically on a reciprocal surface bearing cylinder to permit efficient simultaneous operation of a plurality of welding guns to produce electrically a plurality of closely spaced welds.

In the past, it has been the practice to use oil actuated welding guns when it was desired to simultaneously produce electrically a plurality of closely spaced spot welds. It has been recognized that air actuated welding guns perform better than the oil actuated welding guns used. However, air actuated welding guns providing sufficient pressure to weld properly in the past have had a diameter so large that the welding tips thereof, when positioned axially with respect thereto, cannot be spaced sufficiently close together to produce the required simultaneous welds. It has been attempted to produce the desired welds by providing inclined welding tips on the larger diameter air actuated welding guns. Also, an attempt has been made to position the welding tips of the large diameter air actuated welding guns eccentrically with respect to the axis of the welding gun. Both of these expedients have been unsatisfactory since the inclined welding tips produce unsatisfactory welds and since the piston rod on which the welding tip is positioned in the usual air actuated welding gun produces non-symmetrical stresses on the piston to which it is secured when the welding tips are mounted eccentrically.

Therefore, it is one of the objects of the present invention to provide an air actuated welding gun including an electrode mounting a welding tip eccentrically with respect to the axis of the gun.

Another object is to provide separate air actuated welding guns for simultaneously producing a plurality of closely spaced welds electrically, each welding gun including an electrode mounting a welding tip eccentrically with respect to the gun axis.

Another object is to provide separate air actuated welding guns for simultaneously producing a plurality of closely spaced welds electrically, each welding gun including an electrode mounting a welding tip eccentrically of the axis of the welding gun for movement axially of the welding gun, said electrode being carried by a reciprocal cylinder having surface to surface contact with an outer cylinder whereby stresses on the reciprocal cylinder due to the eccentric mounting of the welding tip are minimized.

Another object is to provide an air actuated welding gun including an outer cylinder, a piston fixedly secured within said outer cylinder, a reciprocal cylinder positioned between said outer cylinder and said piston in surface to surface sliding engagement with said outer cylinder, and an electrode secured to one end of the reciprocal cylinder.

Another object is to provide a welding gun as set forth above wherein said electrode carries a welding tip eccentrically mounted with respect to the axis of the cylinders and piston.

Another object is to provide a welding gun as set forth above wherein said piston is supported on a hollow piston rod through which air is admitted under pressure between said one end of the reciprocal cylinder and the stationary piston as well as between the other end of the reciprocal cylinder and the outer cylinder to move the reciprocal cylinder toward a workpiece.

Another object is to provide a welding gun which is simple in construction, economical to manufacture and efficient in use.

Other objects and features of the invention will become apparent as the description proceeds, especially when taken in conjunction with the accompanying drawings, illustrating one embodiment of the invention, wherein:

FIGURE 2 is a left end view of the welding guns shown in FIGURE 1.

FIGURE 3 is an end view of four welding guns constructed as shown in FIGURE 1 wherein the electrode adaptor and electrodes are modified to provide four simultaneous closely spaced spot welds.

Figure 1:
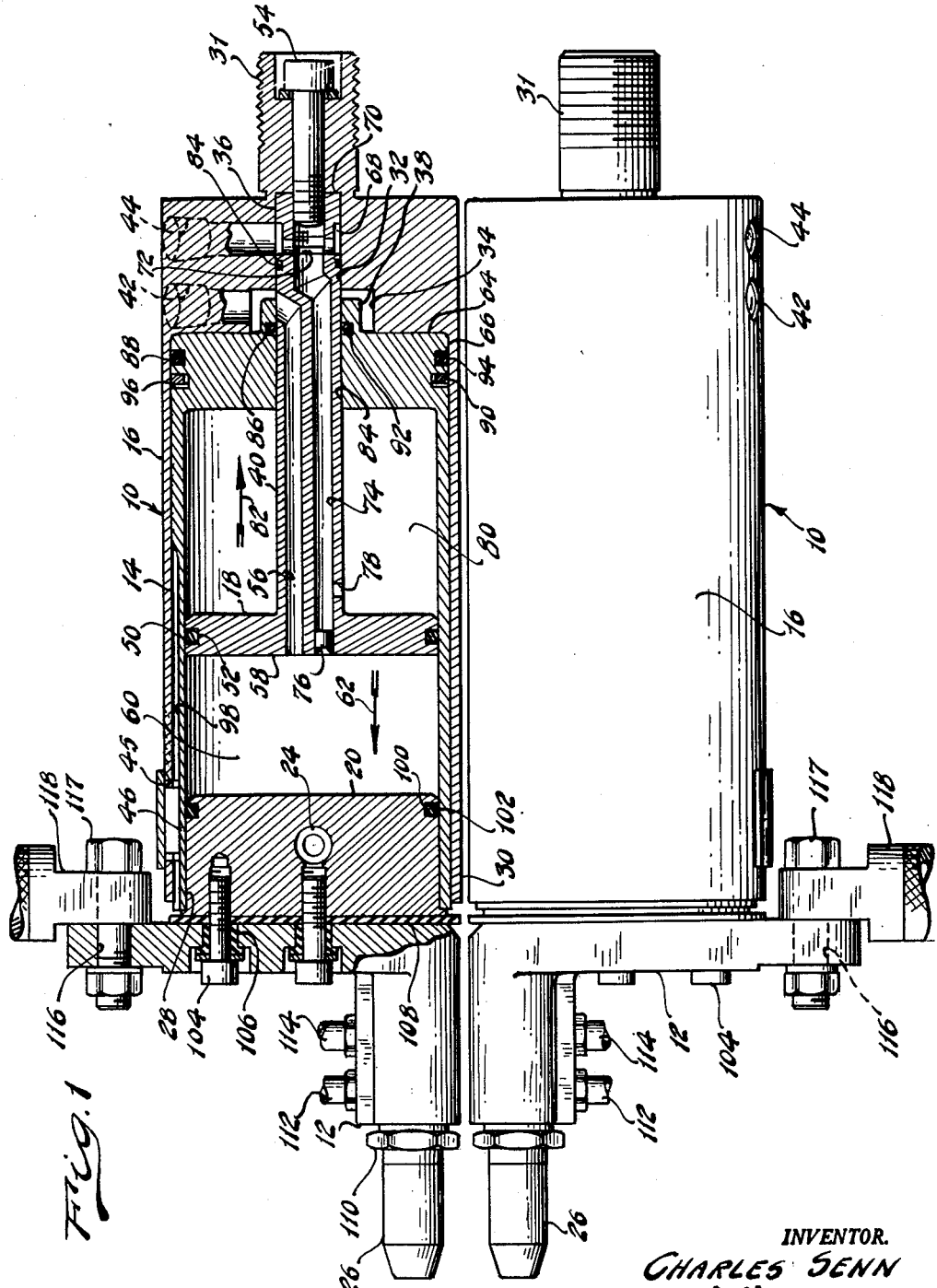
FIGURE 1 is a view of a pair of welding guns, one of which is shown in section, the other of which is shown in elevation, constructed in accordance with the invention.

With particular reference to the figures, a specific embodiment of the present invention will now be described.

In accordance with the invention, air actuated welding guns 10, as shown best in FIGURE 1, are provided with electrodes 12 which are secured to surface bearing reciprocal cylinders 14 and which carry eccentrically mounted welding tips 26. With welding guns constructed as illustrated, close spacing of the eccentrically mounted welding tips attached to separate welding guns is possible for simultaneous production of a plurality of closely spaced welds electrically.

More specifically, an individual welding gun 10 comprises an outer cylinder 16, a piston 18 rigidly secured concentrically within the outer cylinder 16, and a reciprocal cylinder 14 positioned between the piston 18 and the outer cylinder 16 and engaging the outer cylinder 16 in surface to surface sliding contact. The welding gun 10 further includes the electrode adaptor 20 secured within the end 22 of the reciprocal cylinder 14 by means of pin 24, the insulated electrode 12, and the eccentrically mounted welding tip 26.

The outer cylinder 10 is shaped as shown and includes a closed end 28 and an open end 30. An extension 31 is provided on the closed end 28 for securing the welding gun in a fixed position. The closed end 28 of the outer cylinder 16 is further provided with a passage therethrough forming the stepped recesses 32 and 34 adapted to receive the inner ends 36 and 38 of the piston rod 40 and reciprocal cylinder 14 respectively. Passages 42 and 44 extending transversely partly through the closed outer end of the cylinder are provided for the introduction of an actuating medium into the welding gun 10, the actuating medium preferably being air in the embodiment shown. However, it will be understood that the actuating medium may be oil or similar hydraulic fluid.

The opening 45 extends transversely through the wall of the outer cylinder 16 adjacent the open end 30 thereof through which a key 46 extends to prevent relative rotation between the outer cylinder 16 and the reciprocal cylinder 14 in operation of the welding gun 10. The key 46 is removably secured to the outer cylinder 16 by convenient means such as screws 48.

Piston 18 is fixedly secured within both the outer cylinder 16 and the reciprocal cylinder 14 by means of piston rod 40 as shown in FIGURE 1. The outer periphery of the piston 18 slidably engages the inner surface of the reciprocal cylinder 14. O-ring sealing member 50 acts between the piston 18 and the reciprocal cylinder 14 and is seated in the annular recess 52 in the periphery of the piston 18.

The piston rod 40 fits snugly within the recess 32 within the closed end 28 of the outer cylinder 16 and is securely held therein by convenient means such as bolt 54 threaded into the end thereof. The piston rod 40 is further provided with an internal axial passage 56 extending from the surface 58 of the piston 18 to communicate with the passage 42 in the outer cylinder 16 by means of the recess 34. Thus, air may be passed through passage 56 from passage 42 through recess 34 into chamber 60 to tend to move the reciprocal cylinder 14 in the direction of arrow 62 in operation of the welding gun 10 as will be understood by those in the art. In addition, the actuation of the reciprocal cylinder 14 in the direction of arrow 62 will be facilitated by the air from the passage 42 acting on the surface 64 of the inner end 66 of the reciprocal cylinder 14.

The piston rod 40 is further provided with an annular recess 68 around end 70 thereof in communication with passage 44 in the closed end 28 of the outer cylinder 16 whereby air may be conducted through the transverse passage 72 and into a second internal axial passage 74 in the piston rod 40. A plug 76 is provided in the end of passage 74 and a transverse opening 78 in the piston rod 40 is provided to permit the air within the passage 74 to enter chamber 80 whereby the reciprocal cylinder 14 may be moved in the direction of arrow 82. A sealing ring 84 is provided between the piston rod 40 and the closed end 28 of the outer cylinder 16 as shown.

The reciprocal cylinder 14 is also provided with a closed inner end 66 and an open outer end 22. The piston rod 40 extends through a passage 84 located centrally of the inner end 66 of the reciprocal cylinder 14 as shown. Sealing rings 86, 88 and 90 are provided in annular recesses 92, 94 and 96 within the inner end 64 of the reciprocal cylinder 16.

An exially extending keyway 98 is provided in one side of the reciprocal cylinder 14 to receive the key 46 as shown in FIGURE 1. Thus, the reciprocal cylinder is permitted to slide longitudinally within the outer cylinder 16 in surface to surface contact therewith, but is not permitted to rotate with respect to the outer cylinder 16.

As shown in FIGURE 1, the electrode adaptor 20 is secured within the outer end 22 of the reciprocal cylinder 14 by means of the pin 24 extending transversely through both the adaptor 20 and the walls of the reciprocal cylinder 14. A seal between the adaptor 20 and the reciprocal cylinder 14 is provided by means of O-ring 100 in annular recess 102 as shown.

The electrode 12 is shaped as shown in FIGURES 1 and 2 and is secured to the adaptor 20 by means of bolts 104 insulated from electrode 12 by insulating means 106. The electrode 12 is further insulated from the adaptor 20 by insulating sheet 108. An electric conductor is secured to the electrode 12 by convenient means such as bolt 117 extending through the passage 116 in the electrode 12 gripping the conductor 118 positioned as shown in FIGURE 1.

A welding tip 26 is eccentrically mounted on the electrode 12 by means of a threaded adaptor 110. The welding tip 26 may be cooled by a coolant passing into the electrode 12 through the flexible pipe 112 and discharged therefrom through the flexible pipe 114 as will be understood by those in the art.

It will be particularly noted that the electrode 12 is so formed as to mount the welding tip 26 eccentrically with respect to the piston rod 40 and the axis of the cylinders 14 and 16. Through such eccentric mounting of the welding tip 26, welds simultaneously made by a plurality of welding guns 10 may be extremely closely spaced, as for example, by a dimension of 1⅝ inches even though the diameter of the welding guns is substantial such as 4½ inches whereby it is practical to use air to actuate the welding guns 10.

In operation of the welding gun 10, when air is pumped under pressure through passage 42, it immediately acts within the recess 34 and within the chamber 60 to provide a force against the surface 64 of the reciprocal cylinder 14 and the inner surface of the adaptor 20 to cause the reciprocal cylinder 14 to move in the direction of arrow 62 whereby the welding tip 26 is brought into contact with a workpiece not shown which may be conveniently supported on a second welding tip in the well known manner to form a spot weld electrically.

After the weld has been formed, air under pressure may be pumped through passage 44, annular passage 68, and passages 72, 74 and 78 into the chamber 80 whereby the reciprocal cylinder 14 is caused to return to the position illustrated in FIGURE 1 at a somewhat reduced rate due to the reduced area of the reciprocal cylinder on which the air pressure is exerted.

With a pair of such welding guns 10 as shown in FIGURE 1 operating in the manner described in unison, it will be seen that a pair of spot welds spaced very close together may be simultaneously produced. Further, it will be seen that since the eccentric welding tip 26 is supported by the reciprocal cylinder 14 which is in surface to surface contact with the outer cylinder 16, that the wear produced due to the eccentric mounting of the welding tip 26 on electrode 12 will be minimized.

In FIGURE 3 welding guns 10a including a modified electrode 12a and a modified adaptor 20a are illustrated. With the modified adaptor 20a and electrode 12a, it will be seen that four welding tips 26a mounted on four separate welding guns 10a which are placed side by side in a substantially rectangular unit may be provided in close proximity. Thus, with the structure shown in FIGURE 3, four simultaneous spot welds may be provided in close proximity with air actuated welding guns without excessive deterioration of the welding guns due to the eccentric mounting of the welding tips.

What I claim as my invention is:

1. A welding gun, comprising an outer cylinder, a piston positioned within said outer cylinder and rigidly secured thereto, a reciprocal cylinder positioned within said outer cylinder between said outer cylinder and piston for axial movement with respect thereto, and an electrode mounted on said reciprocal cylinder carrying a welding tip displaced radially from the axis of the reciprocal cylinder whereby the welding tips of a plurality of welding guns having a substantial diameter may be closely spaced to simultaneously produce a plurality of closely spaced welds.

2. A welding gun, comprising an outer cylinder, a piston positioned within said outer cylinder and rigidly secured thereto, a reciprocal cylinder positioned within said outer cylinder between said outer cylinder and piston for axial movement with respect thereto, the outer surface of the reciprocal cylinder and the inner surface of the outer cylinder being in sliding contact, and an electrode mounted on said reciprocal cylinder carrying a welding tip displaced radially from the axis of the reciprocal cylinder whereby the welding tips of a plurality of welding guns having a substantial diameter may be closely spaced to simultaneously produce a plurality of closely spaced welds.

3. A plurality of welding guns in side by side relation, each welding gun comprising an outer cylinder, a piston positioned within said outer cylinder and rigidly secured thereto, a reciprocal cylinder positioned within said outer cylinder between said outer cylinder and piston for axial movement with respect thereto, and an electrode mounted on the reciprocal cylinder carrying a welding tip displaced radially from the axis of the reciprocal cylinder directly toward the welding tips of the other of said plurality of welding guns, whereby a plurality of closely spaced welds may be simultaneously produced.

4. A pair of welding guns in side by side relation, each welding gun comprising an outer cylinder, a piston positioned within said outer cylinder and rigidly secured thereto, a reciprocal cylinder positioned within said outer cylinder between said outer cylinder and piston for axial movement with respect thereto, and an electrode mounted on the reciprocal cylinder carrying a welding tip displaced radially from the axis of the reciprocal cylinder directly toward the welding tips of the other of said pair of welding guns, whereby a plurality of closely spaced welds may be simultaneously produced.

5. Four welding guns in side by side relation forming a generally rectangular unit, each welding gun comprising an outer cylinder, a piston positioned within said outer cylinder and rigidly secured thereto, a reciprocal cylinder positioned within said outer cylinder between said outer cylinder and piston for axial movement with respect thereto, and an electrode mounted on the reciprocal cylinder carrying a welding tip displaced radially from the axis of the reciprocal cylinder directly toward the welding tip of the welding gun diagonally opposite thereto with respect to the generally rectangular unit, whereby four closely spaced welds at the corners of a rectangle may be simultaneously produced.

6. An air actuated welding gun, comprising an outer cylinder having a closed end and an open end, a piston positioned within said outer cylinder, a reciprocal cylinder positioned within said outer cylinder between said outer cylinder and piston for axial movement with respect thereto, said reciprocal cylinder having a closed end and an open end, a piston rod extending through the closed end of said reciprocal cylinder rigidly securing the piston to the closed end of the outer cylinder, an adapter closing the open end of said reciprocal cylinder, an electrode secured to said adapter, and a welding tip mounted on said electrode eccentrically with respect to the axis of the welding gun.

7. An air actuated welding gun, comprising an outer cylinder having a closed end and an open end, the closed end of said outer cylinder including a passage extending transversely thereinto, a piston positioned within said outer cylinder, a reciprocal cylinder positioned within said outer cylinder between said outer cylinder and piston for axial movement with respect thereto, said reciprocal cylinder having a closed end and an open end, a piston rod extending through the closed end of said reciprocal cylinder rigidly securing the piston to the closed end of the outer cylinder, an adapter closing the open end of said reciprocal piston, said piston rod including a passage extending axially thereof communicating at one end with a chamber formed by the axially extending walls of the reciprocal cylinder, the piston and the closed end of the reciprocal cylinder and communicating at the other end with the passage in the closed end of said outer cylinder, an electrode secured to said adapter, and a welding tip mounted on said electrode eccentrically with respect to the axis of the welding gun.

8. An air actuated welding gun, comprising an outer cylinder having a closed end and an open end, the closed end of said outer cylinder having an interior axial recess therein and a transverse passage extending from the outer surface into said recess, a piston positioned within said outer cylinder, a reciprocal cylinder positioned within said outer cylinder between said outer cylinder and piston for axial movement with respect thereto, said reciprocal cylinder having a closed end and an open end, a piston rod extending through the closed end of said reciprocal cylinder rigidly securing the piston to the closed end of the outer cylinder, an adapter closing the open end of said reciprocal piston, said piston rod having a passage extending axially thereof communicating at one end with a chamber formed by the axially extending walls of the reciprocal cylinder, the piston and adapter and at the other end with the interior recess, an electrode secured to said adapter, and a welding tip mounted on said electrode eccentrically with respect to the axis of the welding gun.

9. An air actuated welding gun, comprising an outer cylinder having a closed end and an open end, a piston positioned within said outer cylinder, a reciprocal cylinder positioned within said outer cylinder between said outer cylinder and piston for axial movement with respect thereto, said reciprocal cylinder having a closed end and an open end, a piston rod extending through the closed end of said reciprocal cylinder rigidly securing the piston to the closed end of the outer cylinder, an adapter closing the open end of said reciprocal cylinder, an electrode secured to said adapter, means electrically insulating said electrode from said adapter, and a welding tip mounted on said electrode eccentrically with respect to the axis of the welding gun.

10. An air actuated welding gun, comprising an outer cylinder having a closed end and an open end, a piston positioned within said outer cylinder, a reciprocal cylinder positioned within said outer cylinder between said outer cylinder and piston for axial movement with respect thereto, means operable between said outer cylinder and reciprocal cylinder to prevent relative rotation therebetween while allowing axial reciprocation of the reciprocal cylinder within the outer cylinder, said reciprocal cylinder having a closed end and an open end, a piston rod extending through the closed end of said reciprocal cylinder rigidly securing the piston to the closed end of the outer cylinder, an adapter closing the open end of said reciprocal cylinder, an electrode secured to said adapter, and a welding tip mounted on said electrode eccentrically with respect to the axis of the welding gun.

11. An air actuated welding gun, comprising an outer cylinder having a closed end and an open end, a piston positioned witihn said outer cylinder, a reciprocal cylinder poistioned within said outer cylinder between said outer cylinder and piston for axial movement with respect thereto, said reciprocal cylinder being in surface to surface contact with said outer cylinder around substantially the entire circumference thereof, said reciprocal cylinder having a closed end and an open end, a piston rod extending through the closed end of said reciprocal cylinder rigidly securing the piston to the closed end of the outer cylinder, an adapter closing the open end of said reciprocal cylinder, an electrode secured to said adapter, and a welding tip mounted on said electrode eccentrically with respect to the axis of the welding gun.

References Cited in the file of this patent
UNITED STATES PATENTS

| | | |
|---|---|---|
| 2,042,322 | Martin | May 26, 1936 |
| 2,312,938 | Stieglitz | Mar. 2, 1943 |
| 2,358,826 | Purat | Sept. 26, 1944 |